United States Patent [19]

Ohtake et al.

[11] Patent Number: 5,443,574
[45] Date of Patent: Aug. 22, 1995

[54] LIQUID-SEALING TYPE VIBRATION-ISOLATING DEVICE

[75] Inventors: Shuji Ohtake; Hideki Matsuoka; Tetsuo Mikasa, all of Wako; Takeo Naganuma; Kazuto Ohno, both of Fujisawa, all of Japan

[73] Assignees: Honda Giken Kogyo Kabushiki Kaisha; Nok-Megulastik Co., Ltd., Tokyo, Japan

[21] Appl. No.: 248,618

[22] Filed: May 24, 1994

[30] Foreign Application Priority Data

May 26, 1993 [JP] Japan .................... 5-124489

[51] Int. Cl.6 .............. F16M 7/00; F16F 13/00; B60K 5/12
[52] U.S. Cl. ................ 267/140.14; 267/219
[58] Field of Search ........ 267/140.14, 140.15, 267/140.13, 140.11, 140.12, 219, 220; 248/550, 636, 562; 180/350, 312, 902

[56] References Cited

U.S. PATENT DOCUMENTS

| 4,671,227 | 6/1987 | Hollerweger et al. | |
|---|---|---|---|
| 4,700,933 | 10/1987 | Chikamori et al. | 267/140.14 |
| 4,789,143 | 12/1988 | Smith et al. | 267/140.14 |
| 4,889,326 | 12/1989 | Bouhours . | |
| 5,246,213 | 9/1993 | Zup et al. | 267/140.14 |
| 5,310,169 | 5/1994 | Kojima | 267/140.14 |
| 5,330,164 | 7/1994 | Takano et al. | 267/140.14 |

FOREIGN PATENT DOCUMENTS

| 0163817 | 3/1985 | European Pat. Off. . | |
|---|---|---|---|
| 0248942 | 11/1986 | European Pat. Off. . | |
| 0461024 | 6/1991 | European Pat. Off. . | |
| 61-136032 | 6/1986 | Japan | 267/219 |
| 62-88833 | 4/1987 | Japan | 267/219 |
| 3103634 | 4/1991 | Japan | 267/140.14 |
| 4231749 | 8/1992 | Japan | 267/140.14 |
| 4272534 | 9/1992 | Japan | 267/140.15 |
| 4-122841 | 11/1992 | Japan . | |
| 5202980 | 8/1993 | Japan | 267/140.14 |
| 2135795 | 2/1984 | United Kingdom . | |
| 2186052 | 2/1987 | United Kingdom . | |
| 2191561 | 6/1987 | United Kingdom . | |

Primary Examiner—Douglas C. Butler
Attorney, Agent, or Firm—Armstrong, Westerman, Hattori, McLeland & Naughton

[57] ABSTRACT

A liquid-sealing type vibration-isolating device has a primary fluid chamber and a subsidiary fluid chamber which communicate with each other through a short idle orifice and a long shock orifice, and a switch-over valve for connecting the primary and subsidiary fluid chambers with each other through the idle orifice in the low speed revolution range of an engine mounted on the device and through the long shock orifice in the medium-high speed revolution range. During the shifting of the switch-over valve, in order to prevent sudden increase in the spring constant of the device, the primary fluid is short-circuited with the subsidiary fluid chamber through a communication port, the inside of a valve member, a communication bore and an auxiliary communication passage.

9 Claims, 5 Drawing Sheets

LIQUID-SEALING TYPE VIBRATION-ISOLATING DEVICE

BACKGROUND OF THE INVENTION

1. Field of the Invention

The present invention relates to a liquid-sealing type vibration-isolating device for supporting, for example, an engine of a vehicle on a vehicle body in a vibration-isolating manner, and more particularly, to a liquid-sealing type vibration-isolating device including a primary fluid chamber within an elastomer, so that its volume may be varied by a load, a subsidiary fluid chamber communicating with the primary fluid chamber through communication passage means, a fluid sealedly charged within both the fluid chambers, and a switch-over valve for changing the flow length or the flow diameter of said communication passage.

2. Description of the Related Art

There is such a conventionally known liquid-sealing type vibration-isolating device described in Japanese Utility Model Application Laid-open No. 122841/92.

This liquid-sealing type vibration-isolating device includes a variable-volume intermediate chamber with at least a portion thereof defined by a flexible membrane in order to prevent a sudden increase in dynamic spring constant during switching of the communication passage means. The primary fluid chamber is connected to the intermediate chamber when the communication passage means is switched from one state to another by a switch-over valve in accordance with an increase in the number of engine revolutions is increased.

In the above prior art liquid-sealing type vibration-isolating device, however, because it is necessary to provide the intermediate chamber having the flexible membrane, the number of parts is increased and, thus, the size of the entire device becomes undesireably large.

The present invention has been accomplished with the above circumstance in view, and it is an object of the present invention to reduce the number of parts and the size of the liquid-sealing type vibration-isolating device.

SUMMARY OF THE INVENTION

To achieve the above object, according to the present invention, there is provided a liquid-sealing type vibration-isolating device comprising a primary fluid chamber defined within an elastomer, so that a volume of the primary fluid chamber is varied by a load, a subsidiary fluid chamber communicating with the primary fluid chamber through communication passage, a fluid, sealedly charged within both fluid chambers, and a switch-over valve for changing the flow length or the flow diameter of the communication passage, wherein the device further includes an auxiliary communication passage for short-circuiting between the fluid chambers during the shifting operation of the switch-over valve.

BRIEF DESCRIPTION OF THE DRAWINGS

An embodiment of the present invention will now be described in connection with the accompanying drawings, in which.

DETAILED DESCRIPTION OF THE PREFERRED EMBODIMENTS

Figure 1:
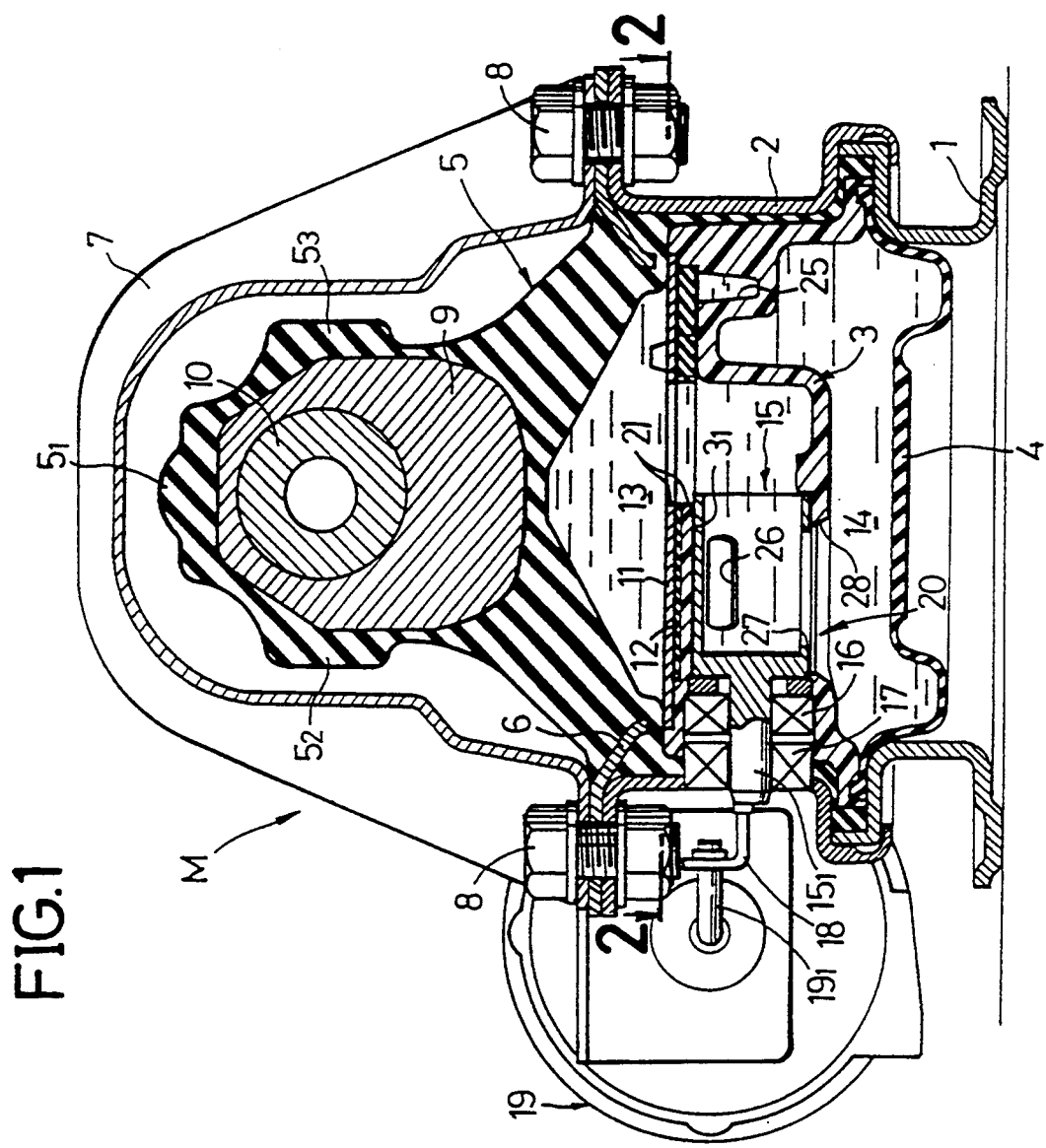
FIG. 1 is a vertical sectional view of a liquid-sealing type engine mount of the preferred exemplary embodiment.
Figure 2:
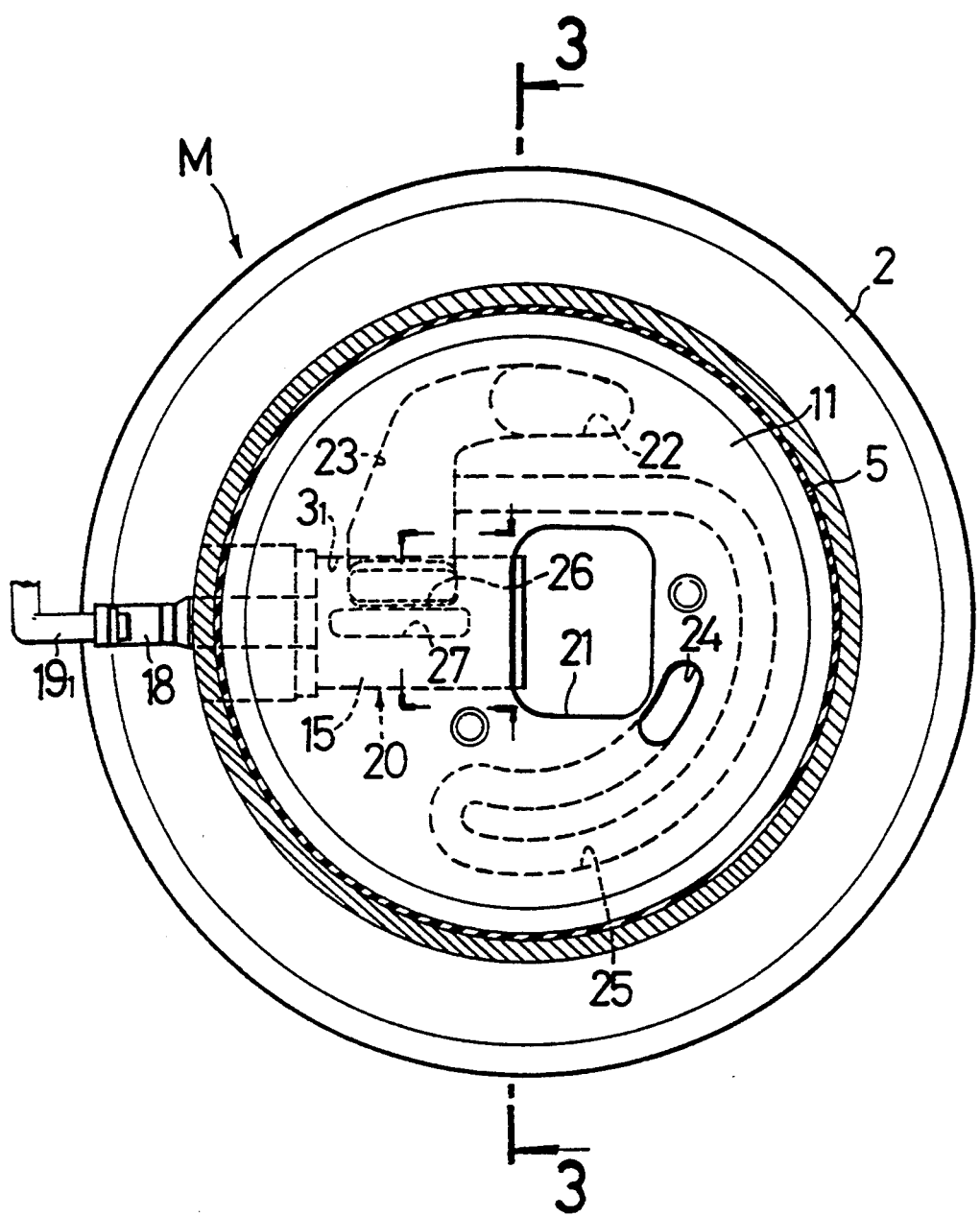
FIG. 2 is a sectional view taken along a line 2—2 in FIG. 1.
Figure 3:
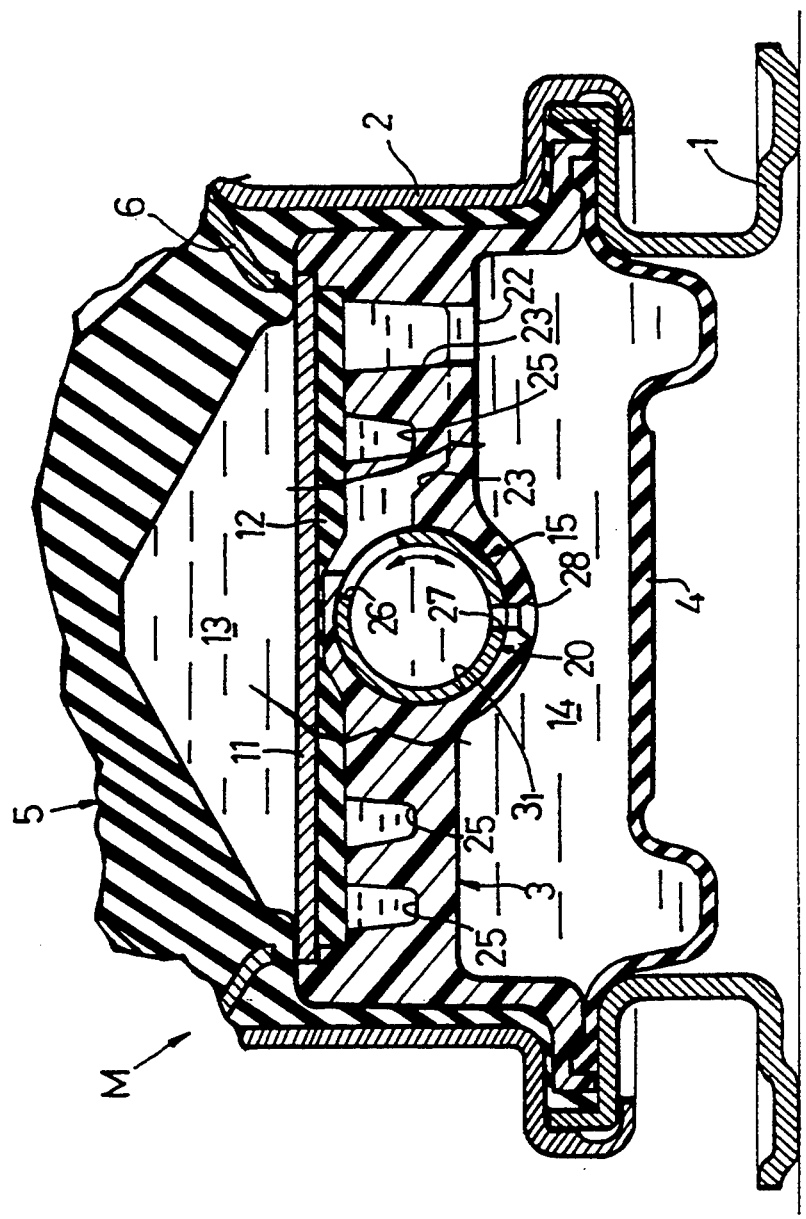
FIG. 3 is a sectional view taken along a line 3—3 in FIG. 2.

As shown in FIGS. 1 to 3, an engine mount M, as a liquid-sealing type vibration-isolating device, includes a base bracket 1 formed into an annular shape for-fixing the engine mount M to a vehicle body. A lower edge of a substantially cylindrical body housing 2 is caulked to an upper edge of the base bracket 1. A valve housing 3 made of synthetic resin or metal such as aluminum, or the like, a diaphragm 4 made of rubber and an elastomeric block 5 of a rubber are clamped and co-fastened from above and below by the caulked portion. An annular reinforcing member 6, embedded into the elastomeric block 5, and an arched stopper 7 are co-fastened to an upper edge of the body housing 2 by a plurality of bolts 8.

A collar 10 is secured to a center boss 9 embedded in an upper portion of the elastomeric block 5. Opposite ends of the collar 10 are projected outside the elastomeric block, and an engine is supported by a bolt (not shown) passed through the collar 10. Three projections $5_1$, $5_2$ and $5_3$ are formed on the elastomeric block 5 covering side and top surfaces of the center boss 9 and are opposed to an inner surface of the stopper 7. When the elastomeric block 5 is largely deformed by a load from the engine, the maximum amount of elastomeric block 5 deformed is limited by abutment of the projections $5_1$, $5_2$ and $5_3$ against the inner surface of the stopper 7.

A bottom plate 11 and a sealing plate 12 are clamped in a vertically superposed relation between the elastomeric block 5 and the valve housing 3. A conical primary fluid chamber 13 is defined between a lower surface of the rubber block 5 and an upper surface of the bottom plate 11. A subsidiary fluid chamber 14 is defined between a lower surface of the valve housing 3 and an upper surface of the diaphragm 4.

A bottomed cylindrical valve member 15, having an open end and a closed end, is accommodated in valve bore $3_1$ defined in the valve housing 3. A stem portion $15_1$ integrally extending from a bottom wall of the valve member 15 extends to the outside of the body housing 2 through a pair of seal members 16 and 17. An arm 18 on a tip end of stem portion $15_1$ is connected to an output rod $19_1$ of a diaphragm type actuator 19. The valve housing 3 and the valve member 15 constitute a switch-over valve 20 of the present invention. A communication port 21 is provided in the bottom plate 11 and seal plate 12 for permitting communication between the primary fluid chamber 13 and the valve bore $3_1$.

A side of the valve bore $3_1$ and a communication bore 22, FIGS. 2 and 3, opened into the subsidiary fluid chamber 14 communicate with each other through an idle orifice 23, FIG. 2, having a short passage length. A communication bore 24, FIG. 2, is defined in the bottom plate and the seal plate 12 and opened into the primary fluid chamber 13. An intermediate portion of the idle orifice 23 and the communication bore 24 communicate with each other through a shock orifice 25, FIGS. 2 and 3, having a long passage length. The idle orifice 23 and the shock orifice 25 are made in an upper surface of the valve housing 3, in an engraved manner, and closed, at their upper faces, by the seal plate 12.

First and second oblong through-holes 26 and 27, FIGS. 1, 2 and 3, are provided in a peripheral surface of the valve member 15. The first through-hole 26 is capable of communicating with the idle orifice 23, while the second through-hole 27 is capable of communicating with an auxiliary communication passage 28 defined in the valve member 3 and opened directly into the subsidiary fluid chamber 14. The valve member 15, of the switch-over valve 20 connected to the actuator 19, is rotated through about 80° from a state shown in FIG. 4A through a state shown in FIG. 4B to a state shown in FIG. 4C with an increase in number of revolutions of the engine mounted on the vibration-isolating device of the preferred exemplary embodiment.

The operation of the embodiment of the present invention, having the above-described construction, is described below, with reference to a graph shown in FIG. 5, in which the input frequency is taken on the axis of abscissas and the dynamic spring constant is taken on the axis of ordinate.

Figure 4A:
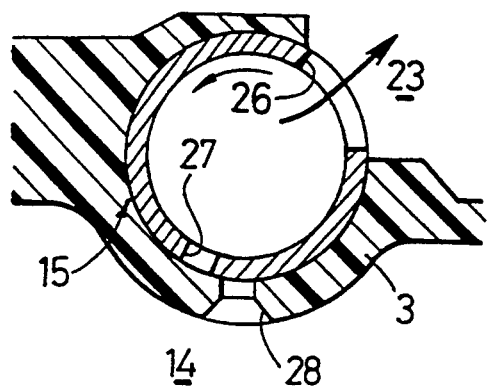
FIGS. 4A, 4B and 4C is a view for explaining the operation of a switch-over valve; and, FIG. 5 is a graph illustrating the relationship between the input frequency and the dynamic spring constant.

In a low speed revolution range of the engine, such as during idling, the valve member 15 of the switch-over valve 20 is in a position shown in FIG. 4A and, hence, the primary fluid chamber 13 and the subsidiary fluid chamber 14 are in communication with each other through a short flow passage including the communication port 21, FIG. 1, the inside of the valve member 15, the first through-hole 26, FIGS. 1, 3 and 4A, the idle orifice 23 and the communication bore 22, FIGS. 2 and 3. At this time, the primary and subsidiary fluid chambers 13 and 14 are also in communication with each other through a long flow passage including the shock orifice 25 and a portion of the idle orifice 23, FIGS. 1, 2 and 3. However, this long flow passage substantially does not function, because it has a larger flow resistance than that of the short flow passage, so that fluid flow is limited.

In the above-described region of revolution of the engine at a low speed, the liquid column of the fluid in the idle orifice 23, having the short flow length, is resonated with a variation in pressure generated in the primary fluid chamber 13 by the deformation of the elastomeric block 5, so that the dynamic spring constant can be further reduced to a larger extent than the main spring component of the elastomeric block 5. As a result, the dynamic spring constant, in the low speed revolution range of the engine, is maintained at a low value, as shown by a solid line a in FIG. 5, thereby permitting the transfer of the vibration from the engine to the vehicle body to be effectively blocked.

Figure 4B:
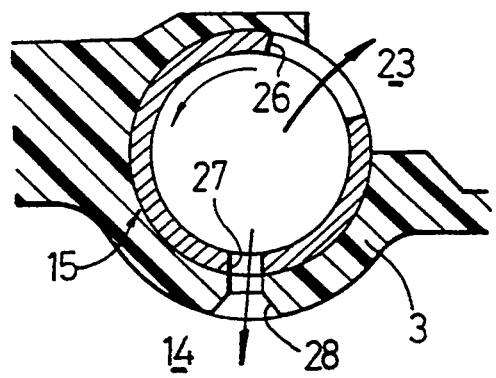
Figure 4C:
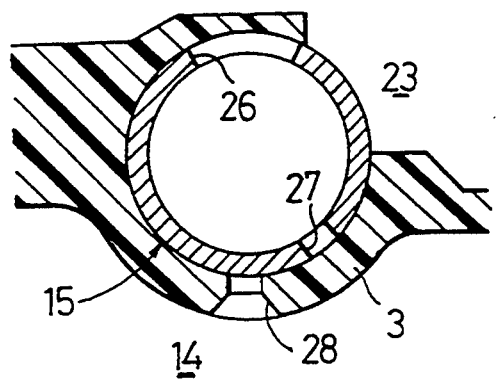

As the number of revolutions of the engine is increased, the switch-over valve 20 is rotated in a counterclockwise direction from a low speed position shown in FIG. 4A and shifted to a medium-high speed position shown in FIG. 4C. As a result, the first through-hole 26 in the valve member 15 becomes misaligned from the idle orifice 23, and the primary and subsidiary fluid chambers 13 and 14 are put into communication with each other only through the shock orifice 25 having the long flow length. This causes the dynamic spring constant, in the medium high speed revolution range of the engine, to be maintained at a low value, as shown by a dotted line c in FIG. 5.

Figure 5:
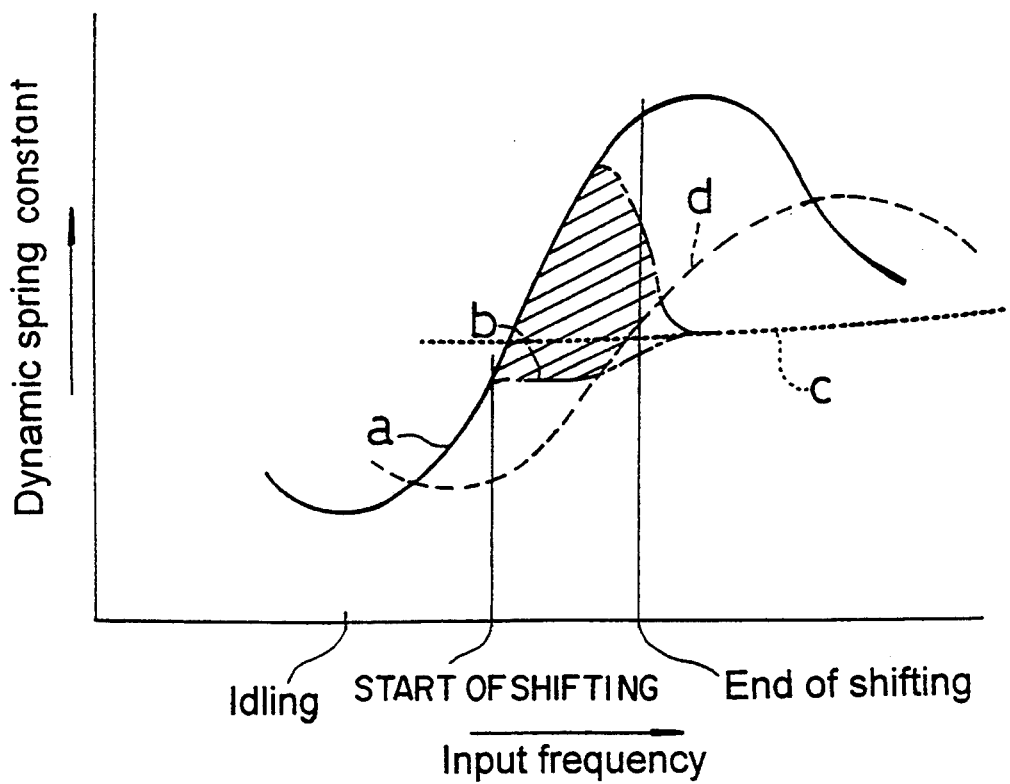

A problematic situation may arise in which, even if the switch-over valve 20 is switched during shifting from the region of the low speed revolution range of the engine to the medium-high speed revolution range of the engine, the dynamic spring constant is not immediately shifted from the characteristic shown by the solid line a, FIG. 5, to the characteristic shown by the dotted line c, but due to some time delay the dynamic spring constant may be increased thereby to follow two dot-dash lines. However, in order to avoid this, according to the arrangement of the preferred embodiment the second through-hole 27 in the valve member 15 is opposed to the auxiliary communication passage 28, as shown in FIG. 4B, at a rotational angle of about 30°, while the valve member 15 is being rotated through about 80° from the position of FIG. 4A to the position of FIG. 4C, thereby permitting the primary fluid chamber 13 to be put into direct communication with the subsidiary fluid chamber 14 to provide a characteristic shown by a dashed line d, FIG. 5. Thus, it is possible to largely reduce the dynamic spring constant from the characteristic shown by the two dot-dash line to a characteristic shown by a one-dot dashed line b and thus to reduce the dynamic spring constant corresponding to a region shown by oblique lines, during shifting from the low speed revolution range to the medium high speed revolution range of the engine.

By putting the primary fluid chamber 13 into direct communication with the subsidiary fluid chamber 14 by the switch-over valve 20, during shifting from the low speed revolution range to the medium-high speed revolution range of the engine, as described above, the dynamic spring constant can be maintained at a low value in a wide input frequency domain. Moreover, because it is not necessary to provide an intermediate chamber having a flexible membrane, which has been required in the prior art, it is possible to reduce the number of parts and the size of the engine mount M.

Although the embodiment of the present invention has been described in detail, it will be understood that the present invention is not limited to this embodiment, and various modifications in design can be made.

For example, although the shock orifice communicates with the intermediate portion of the idle orifice in the embodiment, both the orifices may be provided completely separately. In addition, although the flow length of the orifice is varied in the low speed revolution region and in the medium high revolution range in the embodiment, the flow diameter may be varied in place of the flow length.

As discussed above, according to the present invention, both the fluid chambers are short-circuited therebetween through the auxiliary communication passage during the shifting operation of the switch-over valve to change-over the communication means for permitting the communication between the primary and subsidiary fluid chamber and, therefore, it is possible to prevent a sudden increase in dynamic spring constant during the shifting operation of the switch-over valve and to maintain the dynamic spring constant at a proper value in a wide input frequency domain. Moreover, an intermediate chamber, having a flexible membrane required in such a case in the prior art, is not used and therefore, it is possible to reduce the number of parts of the liquid-sealing type vibration-isolating device to provide a reduction in size thereof.

What is claimed:

1. In an improved liquid-sealing type vibration-isolating device for an engine having a rotating shaft, the device including a primary fluid chamber defined by an elastomer so that volume of said primary fluid chamber is varied by a load, a subsidiary fluid chamber communicating with said primary fluid chamber via a main communication passage means, and a fluid sealedly charged within both said primary and subsidiary fluid chambers, the improvement wherein:

said main communication passage means includes a first passage which is opened and closed by a switch-over valve means in response to a number of revolutions of said rotating shaft; and wherein an auxiliary communication passage means is provided for permitting communication therethrough between said primary and subsidiary fluid chambers only when said switch-over valve means is in a change-over operation thereof.

2. An improved liquid-sealing type vibration-isolating device as recited in claim 1, wherein said auxiliary communication passage includes connecting means for connecting fluid under pressure in said primary fluid chamber with fluid under pressure in said subsidiary fluid chamber.

3. An improved liquid-sealing type vibration-isolating device as recited in claim 2, wherein said connecting means includes a valve.

4. An improved liquid-sealing type vibration-isolating device according to claim 1, wherein said main communication passage comprises:

a shock orifice for always permitting communication between said primary fluid chamber and said subsidiary fluid chamber; and an idle orifice for putting both said primary and subsidiary fluid chambers into or out of communication with each other in a switching manner by means of said switch-over valve means.

5. An improved liquid-sealing type vibration-isolating device according to claim 4, wherein said switch-over valve means comprises a valve bore formed in a valve housing, and a cylindrical valve member which is rotatably received in said valve bore and is open at one of opposite ends and closed at the other of the opposite ends, said cylindrical valve member being provided at a peripheral surface thereof with a first through-hole and a second through-hole, said first through-hole being capable of communicating with said idle orifice, and said second through-hole being capable of communicating with said auxiliary communication passage, said auxiliary communication passage permitting communication between said primary and subsidiary fluid chambers at a flow length shorter than those of said idle orifice and shock orifice.

6. An improved liquid-sealing type vibration isolating device as recited in claim 1, wherein said main communication passage means includes a shock orifice which permits communication between said primary and subsidiary fluid chambers through said shock orifice at all times.

7. An improved liquid-sealing type vibration isolating device as recited in claim 6, wherein said switch-over valve means comprises a valve bore formed in a valve housing, and a cylindrical valve member which is rotatably received in said valve bore and is open at one of opposite ends and closed at the other of the opposite ends, said cylindrical valve member being provided at a peripheral surface thereof with a first through-hole and a second through-hole, said first through-hole being capable of communicating with said first passage, and said second through-hole being capable of communicating with said auxiliary communication passage means, said auxiliary communication passage means permitting communication between said primary and subsidiary fluid chambers at a flow length shorter than those of said first passage and said shock orifice.

8. An improved liquid-sealing type vibration isolating device as recited in claim 1, wherein said change-over valve means conducts its change-over operation dependent on an idling state and a non-idling state of the engine.

9. An improved liquid-sealing type vibration isolating device as recited in claim 1, wherein said switch-over valve means comprises a valve bore formed in a valve housing, and a cylindrical valve member which is rotatably received in said valve bore and is open at one of opposite ends and closed at the other of the opposite ends, said cylindrical valve member being provided at a peripheral surface thereof with a first through-hole and a second through-hole, said first through-hole being capable of communicating with said first passage, and said second through-hole being capable of communicating with said auxiliary communication passage means, said auxiliary communication passage means permitting communication between said primary and subsidiary fluid chambers at a flow length shorter than that of said first passage.

* * * * *